US009386089B2

(12) United States Patent
Doganaksoy et al.

(10) Patent No.: US 9,386,089 B2
(45) Date of Patent: Jul. 5, 2016

(54) EARLY DETECTION OF HIGH VOLUME PEER-TO-PEER SWARMS

(75) Inventors: Necip Doganaksoy, Niskayuna, NY (US); John Michael Lizzi, Wilton, NY (US); Angshuman Saha, Bangalore (IN); Jayanth Kalle Marasanapalle, Bangalore (IN); Joseph E. Cates, San Marino, CA (US); Michelle My-Ly Huynh, Alhambra, CA (US); Andrew Francis Skinner, Valley Village, CA (US)

(73) Assignee: NBCUNIVERSAL MEDIA, LLC, Wilmington, DE (US)

( * ) Notice: Subject to any disclaimer, the term of this patent is extended or adjusted under 35 U.S.C. 154(b) by 1634 days.

(21) Appl. No.: 12/478,356

(22) Filed: Jun. 4, 2009

(65) Prior Publication Data

US 2010/0121955 A1    May 13, 2010

Related U.S. Application Data

(60) Provisional application No. 61/113,227, filed on Nov. 11, 2008.

(51) Int. Cl.
| | |
|---|---|
| G06F 15/173 | (2006.01) |
| H04L 29/08 | (2006.01) |
| G06F 21/62 | (2013.01) |
| H04L 12/00 | (2006.01) |
| H04L 12/26 | (2006.01) |
| H04L 29/06 | (2006.01) |

(52) U.S. Cl.
CPC .......... *H04L 67/104* (2013.01); *G06F 21/6218* (2013.01); *H04L 12/00* (2013.01); *H04L 43/16* (2013.01); *H04L 63/1441* (2013.01)

(58) Field of Classification Search
USPC ..................... 709/224, 226; 726/31
See application file for complete search history.

(56) References Cited

U.S. PATENT DOCUMENTS

| | | | |
|---|---|---|---|
| 7,124,114 B1 | 10/2006 | Hollar | |
| 7,275,083 B1 * | 9/2007 | Seibel et al. | 709/206 |
| 2003/0151619 A1 * | 8/2003 | McBride | 345/736 |
| 2005/0203851 A1 * | 9/2005 | King et al. | 705/51 |
| 2006/0140134 A1 | 6/2006 | O'Brien et al. | |
| 2007/0028133 A1 * | 2/2007 | Izutsu et al. | 714/4 |
| 2007/0078769 A1 | 4/2007 | Way | |
| 2007/0273518 A1 * | 11/2007 | Lupoli et al. | 340/572.1 |
| 2008/0040545 A1 | 2/2008 | Twiss et al. | |
| 2008/0133698 A1 | 6/2008 | Chavez et al. | |

(Continued)

OTHER PUBLICATIONS

Chow et al. BTM—An automated Rule Based BT Monitoring System for Piracy Detection, IEEE Computer Soceity, 2007.*

(Continued)

*Primary Examiner* — Aftab N. Khan
(74) *Attorney, Agent, or Firm* — Fletcher Yoder, P.C.

(57) ABSTRACT

Early detection of high volume swarms in a peer-to-peer network, including a data feed of peer-to-peer swarm activity, and an analytics engine processing the data feed and identifying the high volume swarms that have parameters that exceed a threshold. The system can include a pre-processing section for conditioning the swarm data for the analytics section. There can also be a verification section that confirms that the peer download file matches the target file. The early detection provides for enhanced anti-piracy efforts, improved allocation of network resources, and better business decision-making.

17 Claims, 11 Drawing Sheets

(56) References Cited

U.S. PATENT DOCUMENTS

| | | | |
|---|---|---|---|
| 2008/0255924 A1* | 10/2008 | Chien et al. | 705/10 |
| 2008/0285577 A1 | 11/2008 | Zisapel et al. | |
| 2009/0083132 A1* | 3/2009 | Doganaksoy et al. | 705/11 |
| 2009/0106393 A1* | 4/2009 | Parr et al. | 709/218 |
| 2009/0248872 A1* | 10/2009 | Luzzatti et al. | 709/226 |
| 2009/0259710 A1* | 10/2009 | Porio et al. | 709/201 |
| 2009/0276522 A1* | 11/2009 | Seidel | 709/224 |

OTHER PUBLICATIONS

Fessenden, "Peer-to-Peer Technology Analysis of Contributory Infringement and Fair Use", IDEA—The Journal of Law and Technology, vol. 42, No. 3, pp. 391-416.

Piatek et al. "One Hop Reputation for Peer-to-Peer File Sharing Workloads", University of Washington, pp. 1-14.

Piatek, et al. "Challenges and Directions for monitoring P2P File Sharing Networks", University of Washington Tech. Report, Aug. 6, 2001, pp. 1-7.

* cited by examiner

EARLY DETECTION OF HIGH VOLUME PEER-TO-PEER SWARMS

CROSS REFERENCE TO RELATED APPLICATIONS

This application claims the benefit of U.S. Provisional Application No. 61/113,227, filed Nov. 11, 2008, which is herein incorporated in its entirety by reference.

BACKGROUND

Peer-to-Peer (P2P) file-sharing technologies have rapidly spread as a mechanism to distribute digital information (e.g., multimedia such as movies, TV, music, software, and imagery). One reason for the growth of P2P usage relates to the low cost economics of content distribution and its ease of use.

In very basic terms, peer-to-peer file sharing uses a resident software program on a computer or computing device of a requesting peer user to locate other computing resources on a network, typically the Internet (or other network types such as intranets) that have a file having the content desired by the requesting peer. The general process commences by running a peer-to-peer file-sharing software on the requesting peer computer which send out a request for the desired file on the network. In a trackerless system, the request is circulated to other computers (peers) on the network that have a compatible version of the file-sharing software for the desired file. If a tracker is used, the tracker can manage the peer resources to some extent and facilitates the peer-to-peer processing. When a remote computer resource or peer has been identified as having the desired file or portion thereof, the download begins, and it may be the entire file or a portion of the file. Other remote computers using the file-sharing software can also typically obtain files or portions of files from the various participating peers.

From a general perspective, peer-to-peer (P2P) technologies provide significantly lower cost mechanisms for content providers seeking to distribute digital information to many different interested parties. The P2P network takes advantage of the numerous, diverse connectivity between participants in a network and the cumulative upload/download bandwidth of all network participants allows rapid and cost efficient dissemination of content. Swarms represent groups of peers that interact with each other via a particular file distribution protocol for the purpose of sharing specific content and are largely composed of peers, but typically include "servers" such as the tracker, web server(s), and proxy server(s).

BitTorrent has been one of the most popular protocols for P2P file-sharing and is a protocol that allows a content provider to distribute digital content to a swarm of peers. The peers within the swarm will then disseminate parts of the content to each other in a peer exchange fashion such that as one peer is obtaining new pieces of content, it is simultaneously sharing its other pieces of content with other peers. In a peer-to-peer system, there is typically some content file that is prepared for sharing, wherein the content file is packaged in a format that adheres to the respective P2P protocol being used for the dissemination. Once the content file has been packaged according to the appropriate P2P requirements, the content is typically registered. An origin server, origin seed or web server is typically the initial distribution content point wherein the content provider will post the availability of the content. The information about the content is published indicating that the content file is available for downloading. There are various resources that list available content files so that interested peers can locate the content.

Peers join the swarm by downloading the file information about the content and registering to initiate the transfer process. Peers connect to each other, such as by using peer-lists and the peers exchange pieces of content files. The overall goal of P2P is for a large number of peers in the network of peers to exchange pieces of the content so that each peer obtains a full copy of the content. There can be anywhere from one to hundreds of thousands of participants in a P2P swarm. And, there can be any number of swarms that are participating in the distribution of the same or similar content at the same time.

While the P2P infrastructure has many advantages, it also has led to abuses. Piracy of digital assets on peer-to-peer networks incurs losses by content owners estimated in billions of dollars annually. These costs are typically passed along to the consuming public in terms of increased costs for legitimate purchased works and higher charges for increased deterrents to the piracy. Another problem of the pirated works is that they may not be of adequate quality such that the end-user is disappointed and the content provider may have a damaged reputation.

In addition, P2P networks require adequate resource management. Although there may be many swarms involved in P2P activity, some of the swarms are high volume swarms and tend to present resource allocation dilemmas to the service providers involved in the network communications.

There have been a variety of efforts by content owners to track and monitor the piracy activity involving their assets on P2P networks, and a number of initiatives to mitigate and reduce the piracy efforts. It is desirable that systems and efforts to mitigate piracy be implemented to reduce the peer-to-peer piracy problems.

BRIEF DESCRIPTION

A general embodiment is a system that provides for early identification of high risk swarms to enable a more proactive stance towards anti-piracy efforts. A further embodiment relates to improved allocation of network resources for high volume swarms.

One embodiment is an early identification system for high volume swarms involved in distribution of a target asset on a peer-to-peer network. The system has a data feed of peer-to-peer swarm activity involving distribution of peer-to-peer content, wherein the data feed provides swarm data. There is an analytics section stored on a computer readable medium with executable code, the analytics section establishing thresholds and processing the swarm data, wherein the high volume swarms are each identified as those having a number of unique peers (such as unique Internet Protocol addresses) involved in the distribution of the target asset such that the number of unique peers exceeds the threshold.

According to certain aspects, the system includes a verification section for confirming that the peer-to-peer content from the high volume swarms is substantially similar to the target asset. The system can also include a pre-processing section for conditioning the swarm data.

A further embodiment is a computer readable medium having computer executable instructions providing a method of identifying high risk swarms involved in unauthorized distribution of a target asset, comprising retrieving swarm data, wherein the swarm data is involved in downloading of an alleged target asset, setting a threshold at a static number if there is an inadequate amount of swarm data, updating the threshold based on if there is sufficient swarm data, flagging alleged high risk swarms as those that exceed the threshold, and verifying that the alleged high risk swarms are the high risk swarms involved in the download of the target asset.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
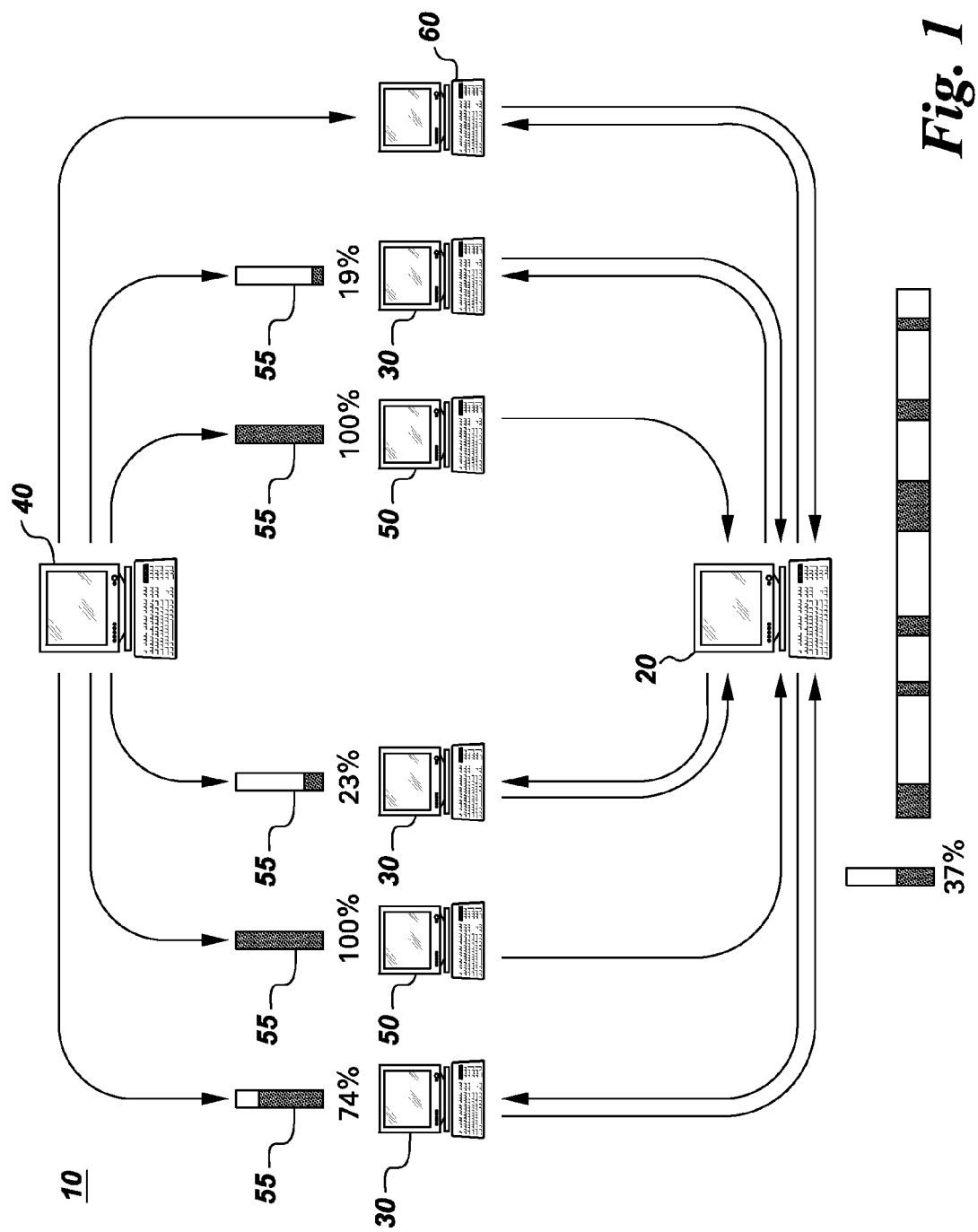
FIG. 1 shows a prior art illustration of a peer-to-peer swarm.

As noted, the P2P networks facilitate the spread and distribution of content that is improperly disseminated without permission from the content owner. For example, movies and videos that are sold in order to compensate the content owner can be copied onto a P2P platform and prevent the content owner from deriving just value for the work. For any given digital asset, there are typically hundreds and sometimes thousands of swarms that facilitate illegal sharing of pirated files. In one embodiment the system provides early identification of the highest risk swarms (such as in terms of their ultimate user size) so as to enable a more proactive stance towards their containment and mitigation of their effects.

As used herein, the high risk swarms refers to high volume swarms that happen to involve the download of unauthorized content, wherein the early identification of the high volume swarms with appropriate remediation reduces the most significant piracy problems. In another embodiment, the early identification of the high volume swarms allows for more efficient network resource allocation.

Currently, tracking and monitoring of piracy swarms is done such that the swarms are treated as equals without any knowledge of high risk targets. This leads to significant erosion in effectiveness of anti-piracy tools and misallocation of resources in targeting low volume swarms. It has been shown that for any given title, there are only a handful of swarms that account for the vast majority of pirate activity. These swarms rapidly reach very large sizes, incurring a great deal of damage even before anti-piracy tools get deployed. Moreover, the large size of the swarms pose even further challenges for anti-piracy tools as mitigation efforts have resource limits. Unfortunately the ability to predict a swarm's popularity with conventional tools is not well developed.

In order to get information about swarm content, data is collected on peers participating in a swarm. This data is typically gathered by "crawlers." The crawlers are not interested in obtaining the content file, but rather they are interested in getting information about the other P2P participants. The major content providers may also detect hundreds of thousands of illegal downloads of its digital assets on P2P networks and the Internet Service Providers may also be a resource for the swarm data.

The type of effective action to mitigate piracy is generally limited by the established data processing and reporting structure. For example, there is typically a delay of several days between when piracy is detected and a notice can be dispatched to commence the cessation of a particular peer. There are large amounts of piracy on the Internet and the time span of established processes to counter P2P piracy takes several days or longer of data gathering and processing. Consequently, anti-piracy measures tend to be reactive and results in an inefficient allocation of resources.

A more precise early identification tool can be used to provide timely knowledge of a swarm's popularity enable deployment of proactive anti-piracy measures as opposed to reactive measures that are too late to do much good. Thus on embodiment involves notice effectiveness programs and similar anti-piracy measures. Another use of such a tool is to enable an Internet Service Provider (ISP) to improve allocation of resources such as bandwidth for legitimate P2P files, caching and server resources. The system and techniques described herein provides for faster exploitation of data gathered from piracy swarms that contributes to a more proactive stance against piracy. According to one embodiment, the present system extracts useful business intelligence from the piracy activity in real-time and this information is utilized for business advantages.

Referring to FIG. 1, a typical P2P network 10 is illustrated for the BitTorrent protocol. There are other P2P protocols that operate in a different fashion although the general functionality will be similar. In this example, the requesting peer 20 has the file-sharing software resident on the computer that permits the formatting and packaging of P2P files and allows the communications with the P2P network for upload and download of pieces of the content files. In this example the requesting peer 20 file download status is noted as 37% that means that 37% of the file has been downloaded from the P2P network 10. It should be noted that the download typically occurs in pieces that are not sequential.

In this example, there are two seeds 50 that represent peers that have obtained the entire file download as noted by the download status indicator 55. There are also a number of other peers 30 participating in the swarm having some percentage of the content file. Ideally, the seeds 50 and peers 30 exchange pieces of the content file in the network 10 until all the peers have the entire file.

As shown, the requesting peer 20 communicates with the seeds 50 and/or the other peers 30 to obtain the entire content file. As the files are transferred, a particular peer 30 downloads more pieces and increases the percentage of the total content file such that at some point the peer 30 obtains 100% of the content file. In one embodiment, a tracker 40 is used to process requests and registrations of peers and also to disseminate peer lists containing information about the other peers 30, and seeds 50 in the swarm as well as the content files.

In this example there is a crawler 60 that participates in the swarm and communicates with the seeds 50 and peers 30 to obtain information about the participants in the swarm. There can be multiple crawlers 60 in the swarm to collect more information about the participants in the swarm. There can also be multiple crawlers 60 participating in multiple swarms to collect data about many different swarms. The crawler 60 would typically obtain the peer list from the tracker 40 as well as data about the other peers 20, 30 that communicate with the crawler 60. The swarm data is accumulated from the various crawlers 60 and communicated to computer resources (not shown) for further processing.

One example of the efforts to combat piracy involves identification of one or more target assets of a content owner that are the subject of the data collection. The content owner may pay for this service in order to take efforts to deter the unauthorized P2P distribution and there are several third party providers for the crawler P2P data collection.

Figure 2:
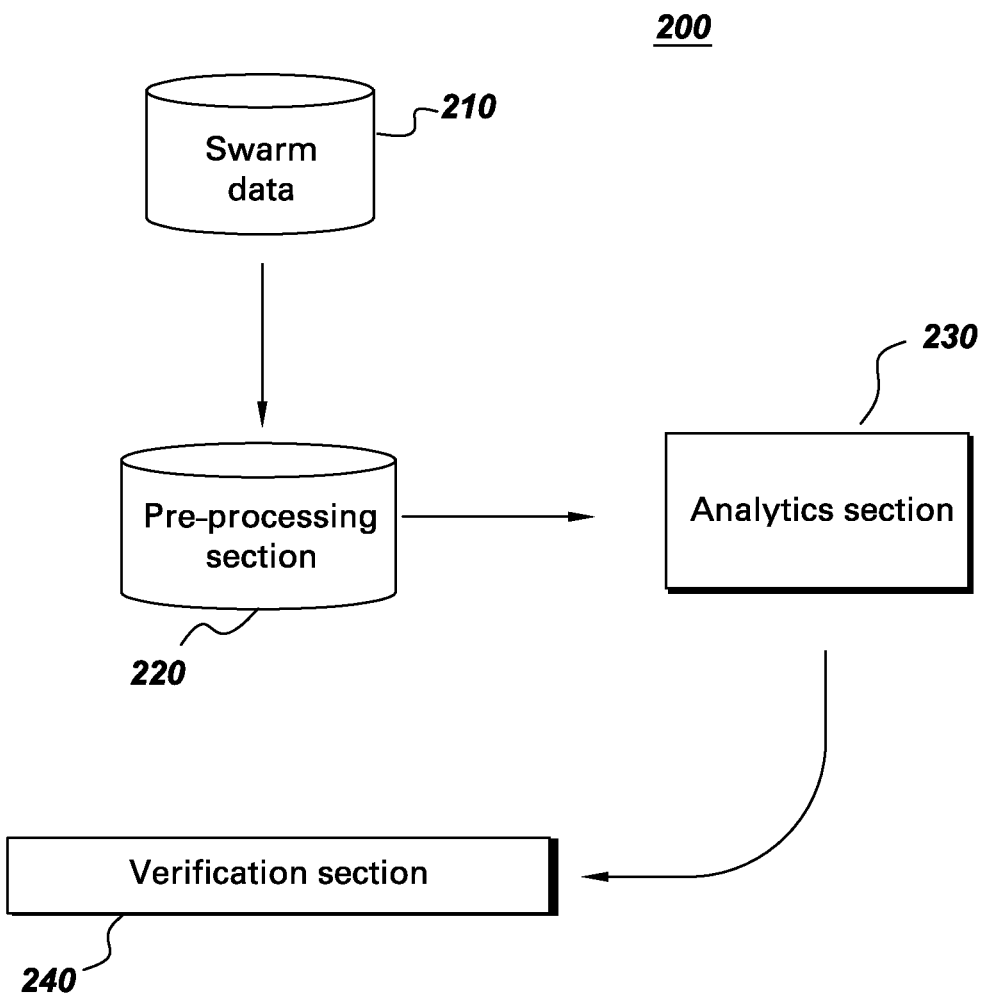
FIG. 2 illustrates a top level block diagrammatic perspective according to one embodiment.

Referring to FIG. 2, a simplified processing 200 according to one embodiment is depicted. In one example, there is a crawler that joins a swarm in order to gain swarm data 210. In the BitTorrent example, the crawler would register with the tracker and participate in the swarm just like any other peer, however it would be collecting data about the other peers.

The swarm data 210 from multiple swarms contains various attributes of the swarm and its participants such as the file requested, the IP addresses of participants, date/time stamps of the files transferred and related information. The swarm data may include hundreds, thousands, or greater number of swarms that is collected from many crawlers and involve multiple content files besides the target asset.

The swarm data 210 undergoes some initial processing by a pre-processing section 220 to condition the swarm data. The conditioning includes organizing, formatting, collecting and otherwise placing the swarm data into a more suitable form for subsequent processing by the analytics section 230. The initial processing is also used to collect and store the data over time and properly retain the data. For example, the data collection may collect data for hundreds of different swarms over a period lasting two or more days, with the data being collected at various intervals during the data collection period.

The processed data then undergoes certain analytical processing in an analytics section 230. The analytics in one example includes real time high risk swarm detection to identify which of the total collected swarms possesses characteristics of high risk swarms. There can also be off-line processing of the swarms for business intelligence. The business intelligence refers to the information or data that is extracted from analyzing the swarm data for patterns or trends. One example of business intelligence is the correlation of increased P2P piracy and the timing of a release in a particular country. If there is a marked increase following a release in a particular country, this information can be used to better manage the global release schedule.

The processing in the verifications section 240 ensures the content file that was in the high risk swarm involves the defined target asset, as there may be multiple swarms involving content with similar titles, similar content, and/or authorized content. For example, many movie trailers are approved for publication by the content owner as a mechanism to promote a movie and may be disseminated on the P2P network along with an unauthorized copy of the movie. In this case, the title, actors and other information would be the same but the trailer would only have a few minutes of content.

There are several verification techniques that can be used to confirm that the content in a high risk swarm is the target asset. A number of audio/video and file fingerprint technologies that are typically used for verification purposes can be utilized for the comparison. In one embodiment, if a swarm is flagged as high risk, the entire content file from the swarm is downloaded to verify that it is the same content of the target asset. In another example, the suspect or targeted files are found through key-word searches (e.g., "The Office"). The verification makes sure that the suspect file indeed contains the unauthorized content and a P2P title such as "The Office" is not simply a commercial for "Office Max". There are varying degrees of automation that can be implemented to check file sizes, check sums, dates and other criteria to perform some degree of verification. In one embodiment a degree of verification certainty is established for the suspect files via automation and more questionable suspect copies are investigated more closely.

Upon identification of the high risk swarm and verification of the content matching the target asset, various response measures can be quickly commenced such as notification to the Internet Service Provider (ISP) or other legal actions to curtail the improper P2P activity. There is a commonly assigned application Ser. No. 12/233,705 incorporated by reference herein for all purposes, entitled "A METHOD AND SYSTEM FOR STATISTICAL TRACKING OF DIGITAL ASSET INFRINGEMENTS ON PEER-TO-PEER NETWORKS" that describes systems and techniques for responding to identified piracy peers.

Figure 3:
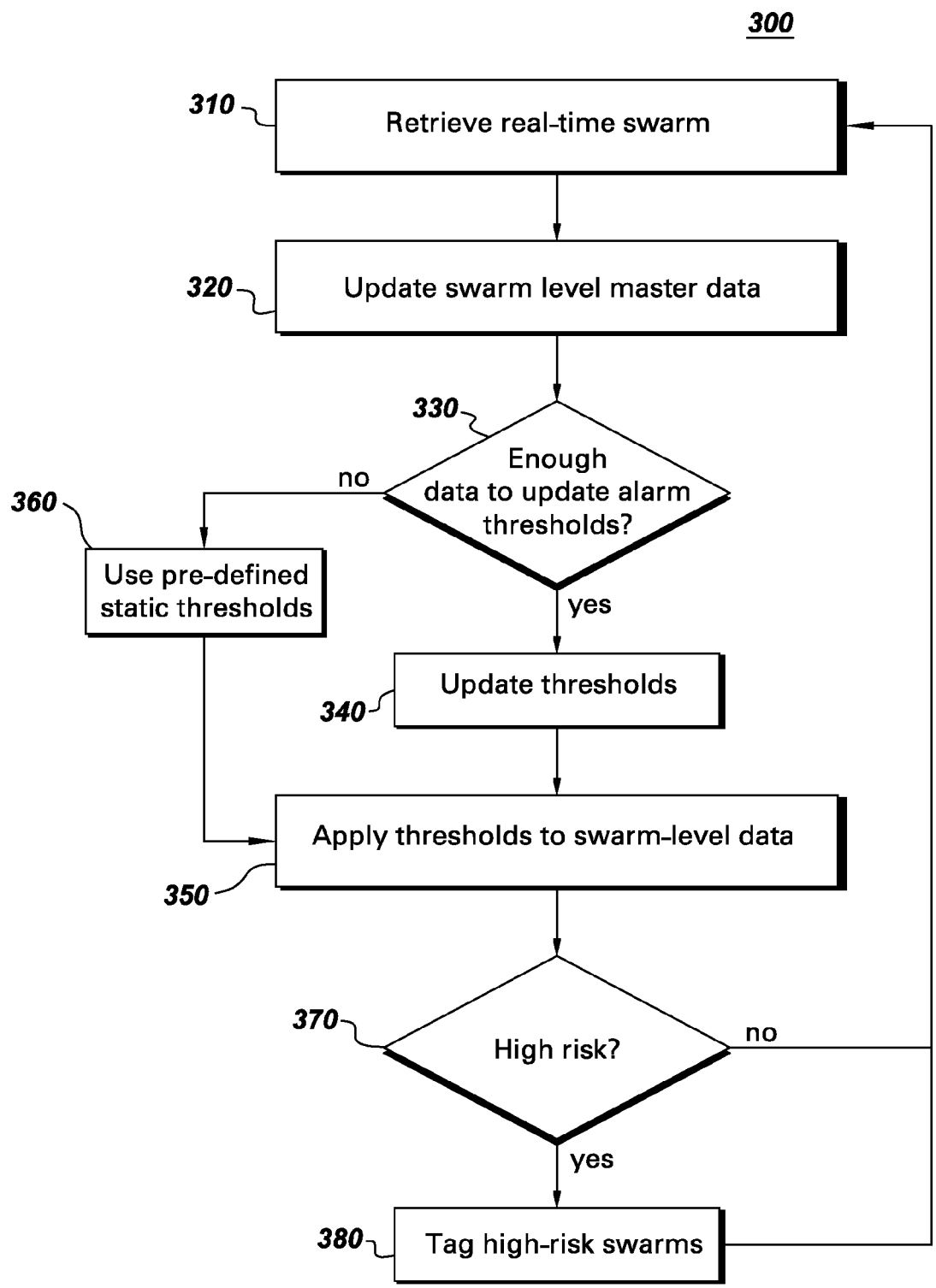
FIG. 3 depicts a flowchart of the high risk/volume identification according to one embodiment.

FIG. 3 shows a detailed flowchart for one embodiment of the swarm analysis processing according to the early identification system 300. The process commences by retrieving swarm data for at least one target asset 310. The collected swarm data is time stamped so that a snapshot of the swarm activity and its participants is captured. In some cases the swarm data may be filtered somewhat to exclude less relevant swarm data. The swarm data typically contains some form of user identifiers and in one embodiment the data is collected in real-time for the target asset. In one example, the content provider may select a target asset, such as a new movie or DVD release, and use one or more crawlers to search for this target asset. In another example, a third party service provider with crawlers participating in swarms and collecting swarm data can provide the swarm data for the processing.

The collected swarm data updates the swarm data 320, which can be stored as master swarm data to maintain a historical database of the crawler data of swarm activity over a certain time period. The swarm data can be grouped in order to categorize the activity and in one example the grouping is by swarm. Various filters can be utilized to arrange the swarm data according to the desired application. For example, for a particular target asset the aggregated swarm data can be arranged to look at specific swarms and look at the attributes of the specific swarm for certain characteristics. In other situation, time may be a dominant factor and the swarm data is analyzed for a specific time range.

A determination is made according to one embodiment as to whether there is sufficient data to update or establish the thresholds 330. The thresholds are used to make the determination as to whether a particular swarm is a high risk swarm, and while static thresholds can be used initially, the thresholds should be adjusted as the data is collected and the characteristics of the swarm are revealed. For example, the high risk thresholds for each new movie may be different depending on the movies popularity. And, the thresholds vary over time as new swarms occur. In one approach data from existing swarms is used (e.g.: baseline data) to set alarm thresholds to flag future swarms. Based on initial testing, once 30 swarms were accumulated there was sufficient information to start updating the thresholds.

Once sufficient swarm activity (such as 30 swarms) has been accumulated, the system typically switches to an adaptive scheme to update the thresholds 340. This allows dynamic adjustment of the thresholds used to assess whether a particular swarm is high risk or not. For example, if there are too few swarms identified, then the thresholds are too tight and would be adjusted accordingly. Likewise, if there are a large percentage of the swarms identified as high risk swarms, the thresholds are modified accordingly. The threshold parameters are adjusted according to design criteria for the intended application. Certain hot releases with pent up demand tend to have very fast growing swarms while niche releases may be a lower level of activity and growth. The system may set an initial alarm threshold and provide for a relatively quick adjustment to the initial threshold followed by one or more re-adjustments as more data is accumulated. The threshold parameters can be numbers, percentages or the equivalent downsizing performed graphically.

If there is insufficient data to establish meaningful thresholds, user pre-defined static thresholds are used 360. By way of illustration of one example, for the first 20-30 swarms, "static limits" are used since there is insufficient baseline data. In one example, 30 swarms were considered sufficient although the number depends upon the circumstances. Static limits are typically fixed numbers or percentages that establish a working platform and is subject to adjustment based on more data and/or experience. In one example, a static number of 500 was utilized based on some initial experience with the data collection for related assets. More specifically, the system flags a swarm as high risk if its size reached 500 unique users in the first 48 hours after its initiation.

Whether the thresholds are determined from static levels or processed through the processed models, the next step involves applying the thresholds to the swarm data to determine whether a swarm is a high risk 350. In one embodiment, during the first few hours of collecting the swarm data, predictive models are used to apply the threshold to the swarm data since this provides a better evaluation with a limited data set. As the amount of swarm data increases, such as after the first day, a probabilistic model is used for computing the dynamic threshold.

Based on the application of the threshold to the swarm data a determination is made as to whether a particular swarm is a high risk swarm 370 based on comparing the particular swarm characteristics to the thresholds. If it is not a high risk swarm, the processing goes back to retrieving the swarm data and running subsequent evaluations. If the swarm is a high risk swarm, it is flagged or otherwise denoted as a high risk swarm 380 and subsequently processed. The subsequent processing may include verification and notification.

By way of example of a simple illustration, suppose that 5 swarms have been detected since the release of a target movie. The sizes of the swarms (in terms of unique IP addresses) at the end of their first 48 hours can be expressed as follows in Table A:

TABLE A

| Swarm Identification | Size |
|---|---|
| 1 | 459 |
| 2 | 268 |
| 3 | 564 |
| 4 | 190 |
| 5 | 15 |

It is noted that the 48 hour time period was deemed to be an acceptable period based on earlier efforts. A static number such as 500 can be used as a hard limit, at least initially, and in this example, swarm identification number 3 would be identified as a high risk swarm with a swarm size of 564 unique peers.

Once there is sufficient baseline data, the threshold can be adjusted to reflect the intelligence gained from the additional swarm information. For example, the baseline data can be some fixed number of swarms, such as 20-30 swarms, or set using a different trigger depending upon the circumstances. The thresholds can be updated in several manners. In one embodiment during the first few hours of the swarm, predictive models are used to determine the threshold limits to identify a high risk swarm. Following the first few hours, probabilistic models are used to determine the threshold.

By way of illustration of one example, suppose there are N1 existing swarms that had been detected at least 48 hours ago. Suppose there are N2 new swarms that have been detected in the past 48 hours. The processing uses data from N1 existing swarms to decide which, if any, of the N2 new swarms need be flagged. As time passes, the new swarms join the existing swarms and the swarm data is used in updating the thresholds.

The steps in the probabilistic models processing in this example include the following:

Step 1: Calculate the sum of unique IP addresses joining the swarm for the first 48 hours after a swarm's initiation for all N1 existing swarms (this will give N1 values)

Step 2: Fit a LogNormal distribution to N1 values from Step 1. This yields mu=numerical average of natural log of N1 values; sigma=standard deviation of natural log of N1 values.

Step 3: Estimate the 100Pth percentile, exp(mu+Zp sigma) where Zp is the 100Pth percentile of the standard normal distribution (e.g., Z for $90^{th}$ percentile is =1.282).

Step 4: Flag swarms for which the IP count in the first 48 hours exceed the estimated percentile value.

These steps can be carried out as frequently as need be (i.e., every second or two or more times a day).

Under the predictive modeling, one embodiment inflates the "threshold" in Step 3 for swarms in the first 24 hours. In one predictive modeling implementation, the following rule was used to flag swarms in the first 24 hours:

$$\left(\frac{48}{\text{Swarm Age}}\right) \text{New\_IP\_Count} >$$

$$12.55 \text{ Swarm Age}^{-.63} \text{(Threshold from Step 3)}$$

The normal use of the Threshold to detect high risk swarms is as follows. Flag if New_IP_Count>Threshold from Step 3.

In addition, for swarms in their initial 48 hours the following rule is also used. New_IP_Count_Extrapolated_to_48 hours>Inflation_Factor×Threshold from Step 3.

On the left hand-side, $$\left(\frac{48}{\text{Swarm Age}}\right) \text{New\_IP\_Count}$$

is a simple extrapolation of swarm size to 48 hours. On the right-hand side 12.55 Swarm Age$^{-0.63}$ is a positive number (inflation factor) to inflate the threshold value.

The inflation of the threshold is done to account for added uncertainty due to the fact that the age of the swarm is less than 48 hours. This specific inflation factor was obtained empirically for the case study example. The inflation factor is typically movie specific and need be adjusted for each new title, but can be estimated from similar swarms and adjusted as knowledge about the swarm increases.

As described herein, the thresholds are used to identify high risk swarms. High risk swarms in one embodiment is defined to be the largest 10% of all swarms, however this parameter is adjustable and can be changed. For example, if a higher percentage of swarms was desired, then the percentage can be expanded. For 10% parameter, $Z=1.28$ would be used. For a 5% or 15% parameter, different values of the standard normal distribution would be used.

One example to illustrate the processing is provided in order to show simplified operations. Assuming that $N1=40$ swarms that presently exist. The sizes (unique IP addresses) after 48 hours is as shown as follows in Table B:

TABLE B

| 198  | 223  | 647  | 2121 |
|------|------|------|------|
| 412  | 80   | 4    | 91   |
| 1040 | 26   | 480  | 7179 |
| 3491 | 980  | 116  | 1621 |
| 527  | 6174 | 372  | 76   |
| 6973 | 459  | 49   | 30   |
| 946  | 268  | 568  | 85   |
| 428  | 564  | 2586 | 5    |
| 481  | 190  | 742  | 533  |
| 2449 | 15   | 164  | 521  |

The processing proceeds as follows: Step 1: The analysis attempts to ascertain if any of the following $N2=3$ swarms pose a high risk swarm problem. Assume that these swarms are 24-48 hours old and their current sizes are 1, 124, 879, 4, and 323.

Step 2: Using data in step 1→mu=5.81, sigma=1.80
Step 3: Threshold=exp (5.81+1.28×1.80)=3,330
Step 4: Flag the swarm with size 4,323 as high risk since its size>3,330

Suppose there is another new swarm that is only 12 hours old with a size of 375 users. The following is processed as an example:

$$\left(\frac{48}{\text{Swarm Age}}\right) \text{New\_IP\_Count} >$$

$$12.55 \text{ Swarm Age}^{-.63}(\text{Threshold from Step 3})$$

$$\left(\frac{48}{12}\right)375 = 1500 \text{ is not} > 12.55(12)^{-.63}(3,330) = 8,733$$

This is not yet flagged to be a high risk swarm. In further analyses, the new swarm becomes part of the baseline data used in Step 1.

In a further embodiment, the system collects swarm data without any processing until a desired threshold is obtained. For example, for a 30 swarm threshold, the system counts the swarm data until the count threshold of 30 is achieved. In some respects this technique simplifies the processing and accommodates design criteria imposed by the implementation environment. The general thrust of the system and technique is to utilize early data on swarm sizes to make a determination on the swarms ultimate size relative to all other swarms.

In yet another embodiment, the processing can proceed by establishing a period for the data collection and processing. In one example the data collection and processing occurs daily, however for different applications the period can be a set to a number of hours or a set number of days. The period can be adjusted either manually or in an automated fashion according to certain thresholds. For example, if the swarm activity was particularly robust, the period could be reduced so that it occurred more frequently. Likewise, if the activity was slow, the period could be made longer.

For each time period, the data is collected and then organized or classified such as by swarm. The cumulative number of IP addresses of each swarm is calculated, wherein the cumulative IP address represents the number of unique peers in a particular swarm.

The threshold is calculated for swarms that have a suitable age for establishing a reasonable threshold. The age that makes the threshold suitable depends upon certain factors such as the size and activity of the swarm. In one example, the suitable age is greater than or equal to one day.

The threshold is set in order to focus on the major swarms and to provide a manageable set of high risk swarms that represent the majority of the piracy activity as detailed herein. In one example the threshold is set to the $90^{th}$ percentile of the cumulative IP addresses for the swarms. The threshold is then compared against the data for the cumulative IP addresses and the alarm is set for any swarms that exceed the threshold.

According to a further aspect, multiple thresholds are established so that the corresponding response can be directed accordingly. In one example the thresholds are established to identify a first set of the highest risk swarms in order to provide a fast response and mitigate their activity. For example, the threshold can be first set for the $95^{th}$ percentile with a second set of high risk swarms in the $90^{th}$ to $95^{th}$ percentile for a separate response. Further sets of groupings and corresponding responses are also within the scope of the system.

As part of the processing, a sample trial work was used to establish distinguishing characteristics of high risk piracy swarms for a popular movie. One trial involved continuous scanning of BitTorrent swarms and tracked 1.2 MM unique downloaders involving 705 swarms globally over an 8-week period following a DVD release. Note that the figures are provided to illustrate the results of the trial but are not drawn to include all the trial details or drawn to scale.

Figure 4:
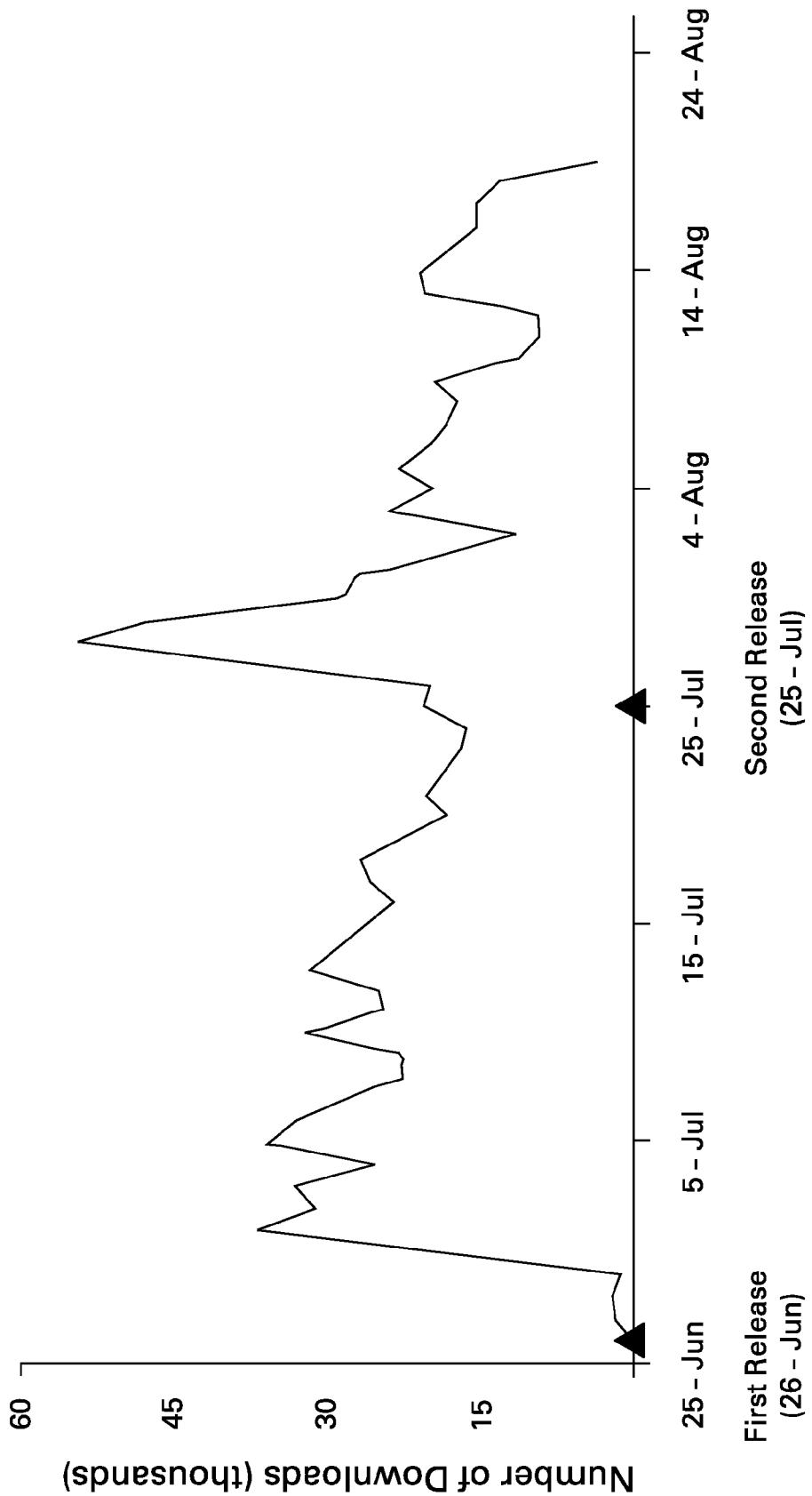
FIG. 4 shows the swarm activity across all swarms for unique users.

Referring to FIG. 4 the evolution of all swarms is depicted with unique users for a particular release. Following the DVD first release on June 25, approximately 1.2 million unique downloads were processed from the 705 global swarms for the time period of June 25 through August 19. The sharp increase around July 25 coincides with the second release of the DVD in a country prone to piracy. As shown, the P2P download activity climbed above 50,000 downloads after the second release.

Figure 5:
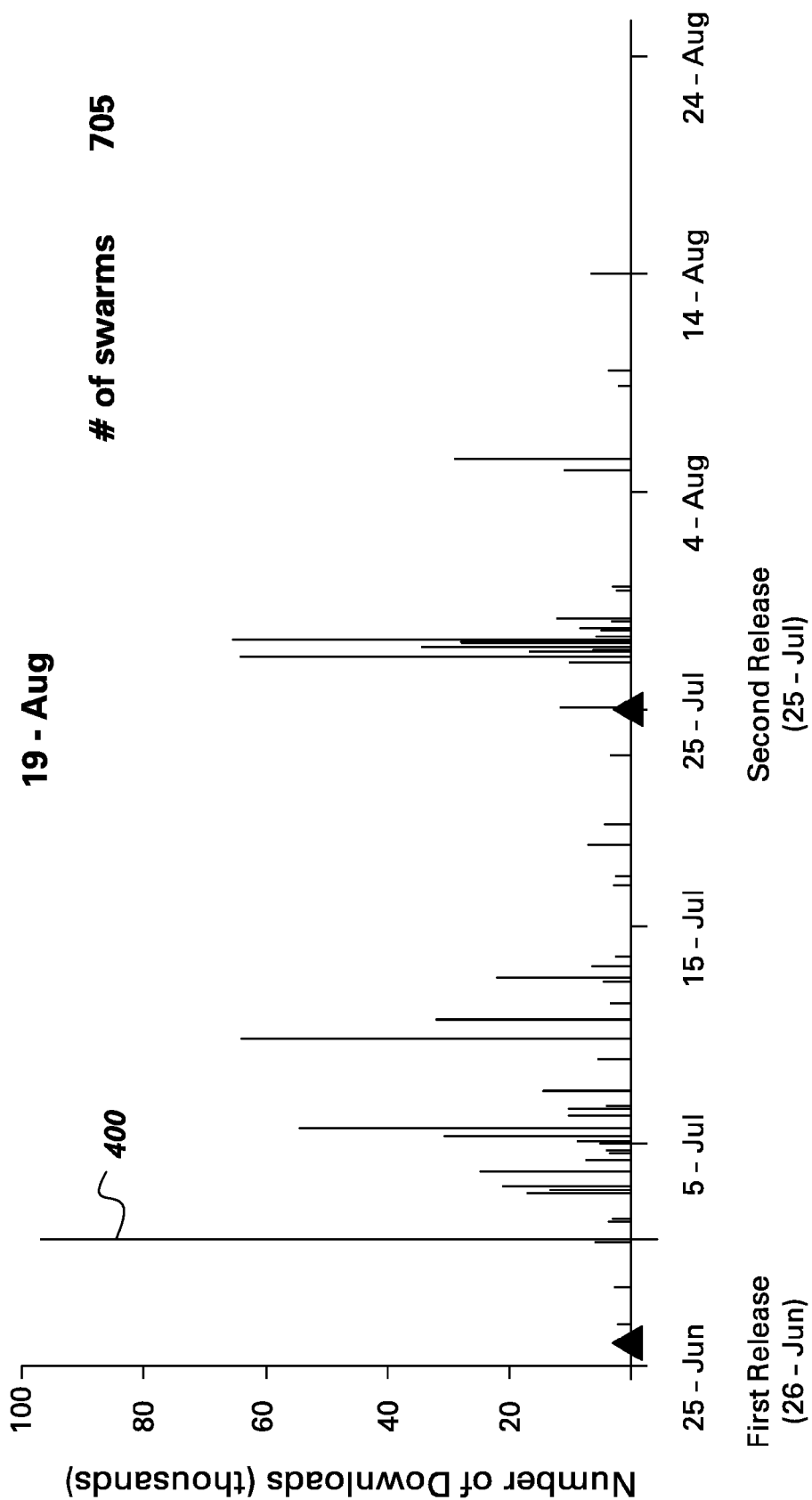
FIG. 5 shows the swarm activity by individual swarms across a timeline.

For illustrative purposes, the swarm data in FIG. 5 presents the data of FIG. 4 in a different perspective. Each of the lines represents an individual swarm 400, and the data is shown according to the timeline. As noted, some of the swarms 400 are high volume swarms while other are almost negligible.

Figure 6:
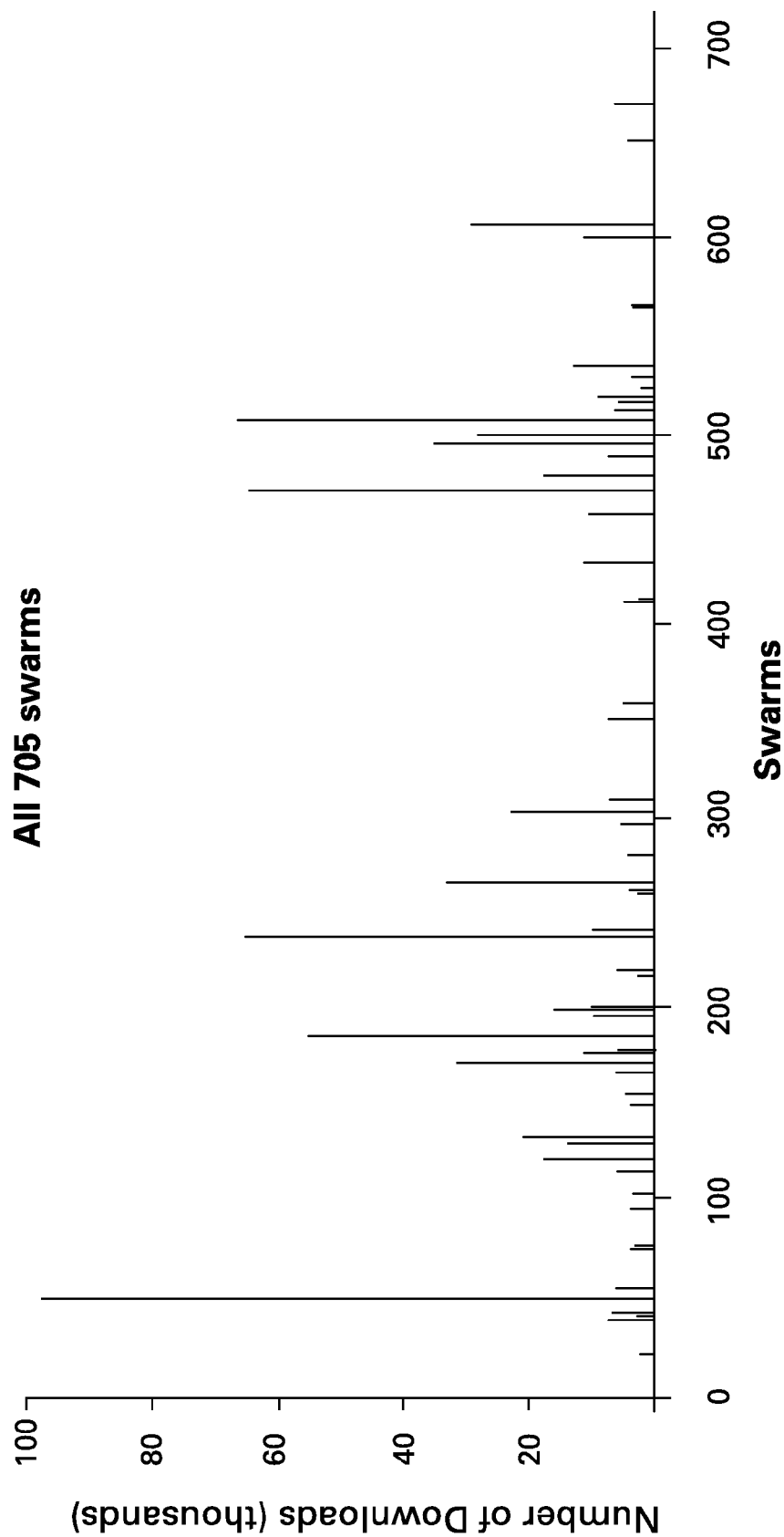
FIG. 6 shows the swarm activity by individual swarms illustrating the sizes of the swarms.

FIG. 6 presents the swarm data in a different perspective showing the evolution of the individual swarm such that the swarms are depicted by individual swarm number and shows the amount of downloads for each swarm. As noted, some of the swarms have a much higher number of downloads. There are a number of swarms having only a few thousand downloads each, while certain swarms approach 100,000 downloads.

Figure 7:
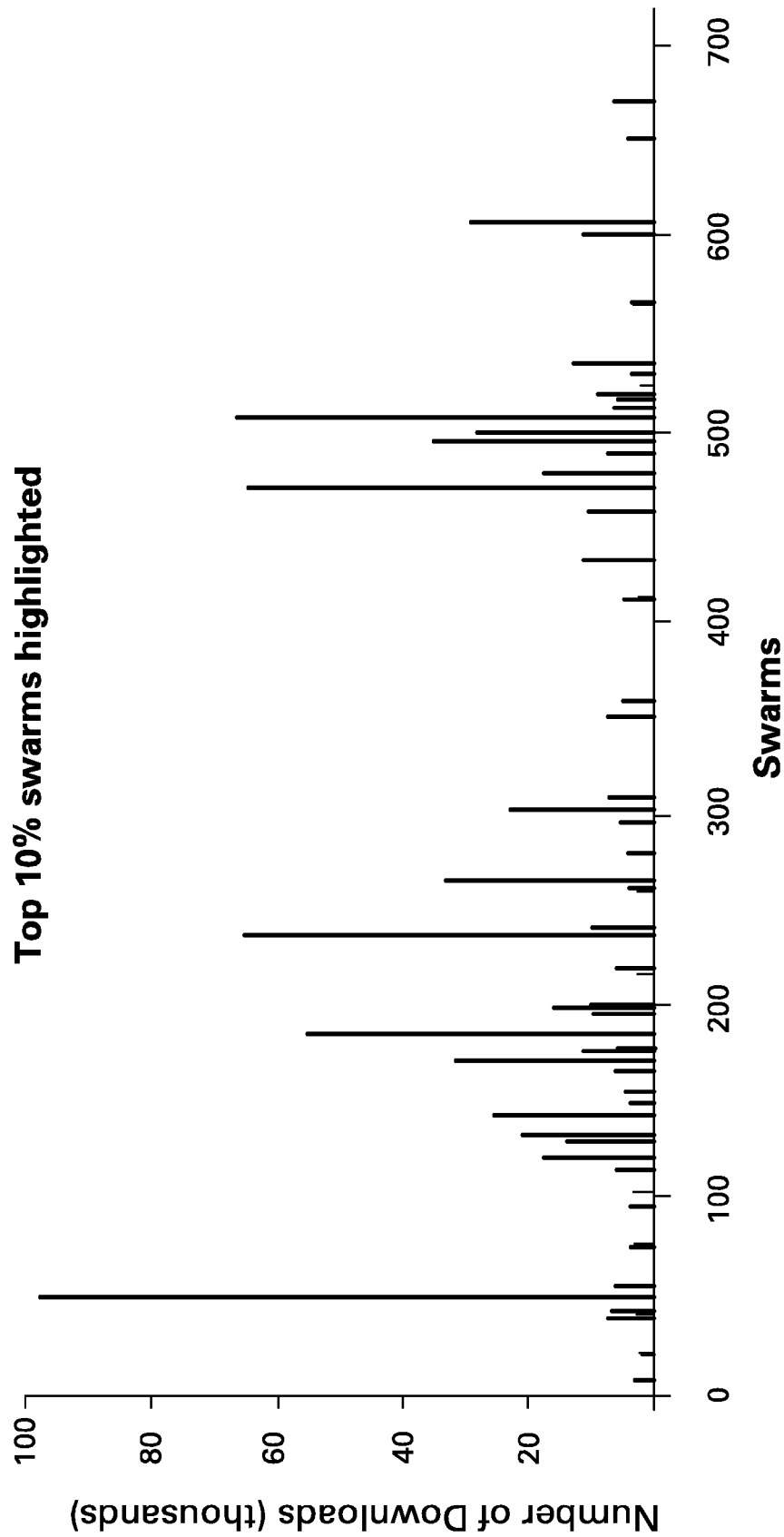
FIG. 7 shows the swarm activity by individual swarms with the top swarms highlighted.

FIG. 7 is similar to FIG. 6 but the top 10% of the swarms in terms of downloads are bolded. As noted, many of the other swarms are relatively small and do not have appreciable number of downloads. Allocating resources to all 705 swarms would be inefficient and costly, whereas it is far more effective to concentrate on the top percentage of the swarms. Using the 10% limit, the 705 swarms are reduced to about 70 swarms. A different percentage would yield a different number of swarms.

Figure 8:
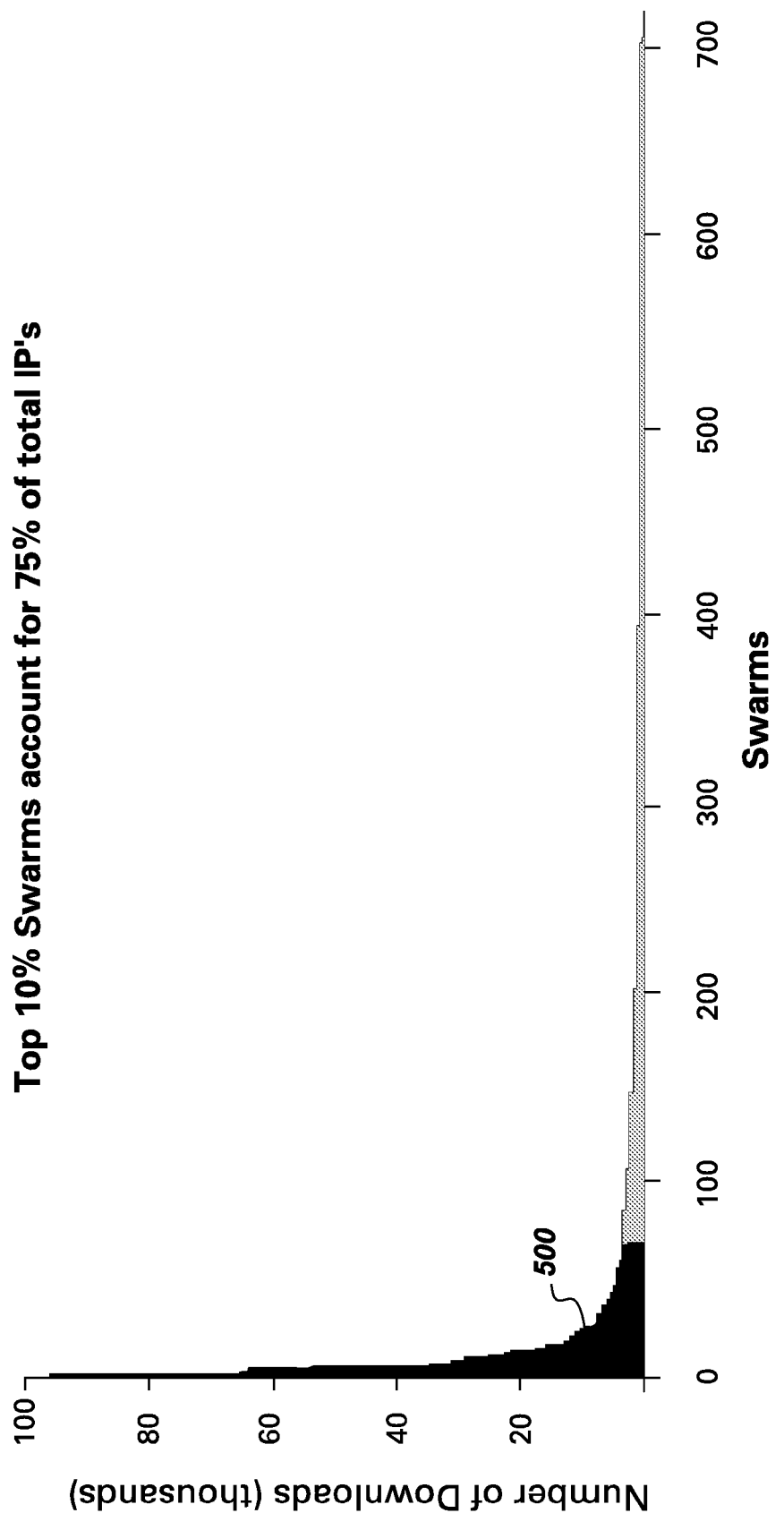
FIG. 8 shows the swarm activity and illustrates that a small number of swarms account for the majority of the swarm activity.

Referring to FIG. 8, this clearly shows that a small number of swarms 500 reflect the majority of the download activity. The top 10% of the swarms 500, per unique Internet Protocol address, account for about 75% of the total downloads. Thus, only about 10% of the high volume swarms are responsible for the vast majority of the swarm activity. Based on other trials, this is consistent across various types of piracy.

Figure 9:
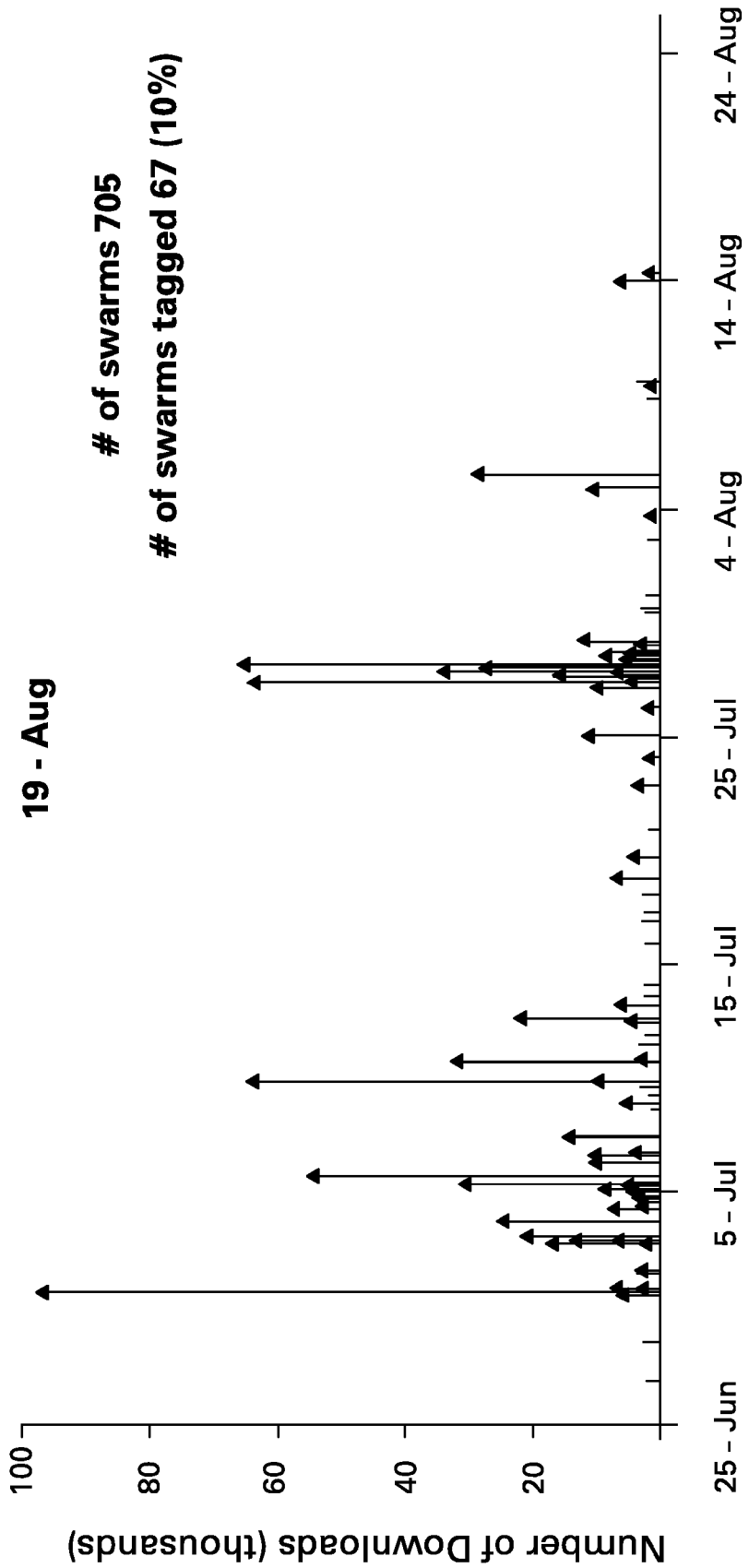
FIG. 9 shows the real time identification of high volume/risk swarms.

In FIG. 9, the real time detection of high risk swarms for the trial is depicted. In this trial processing, 10% of the 705 swarms represented 67 swarms and account for the majority of the downloads.

Figure 10:
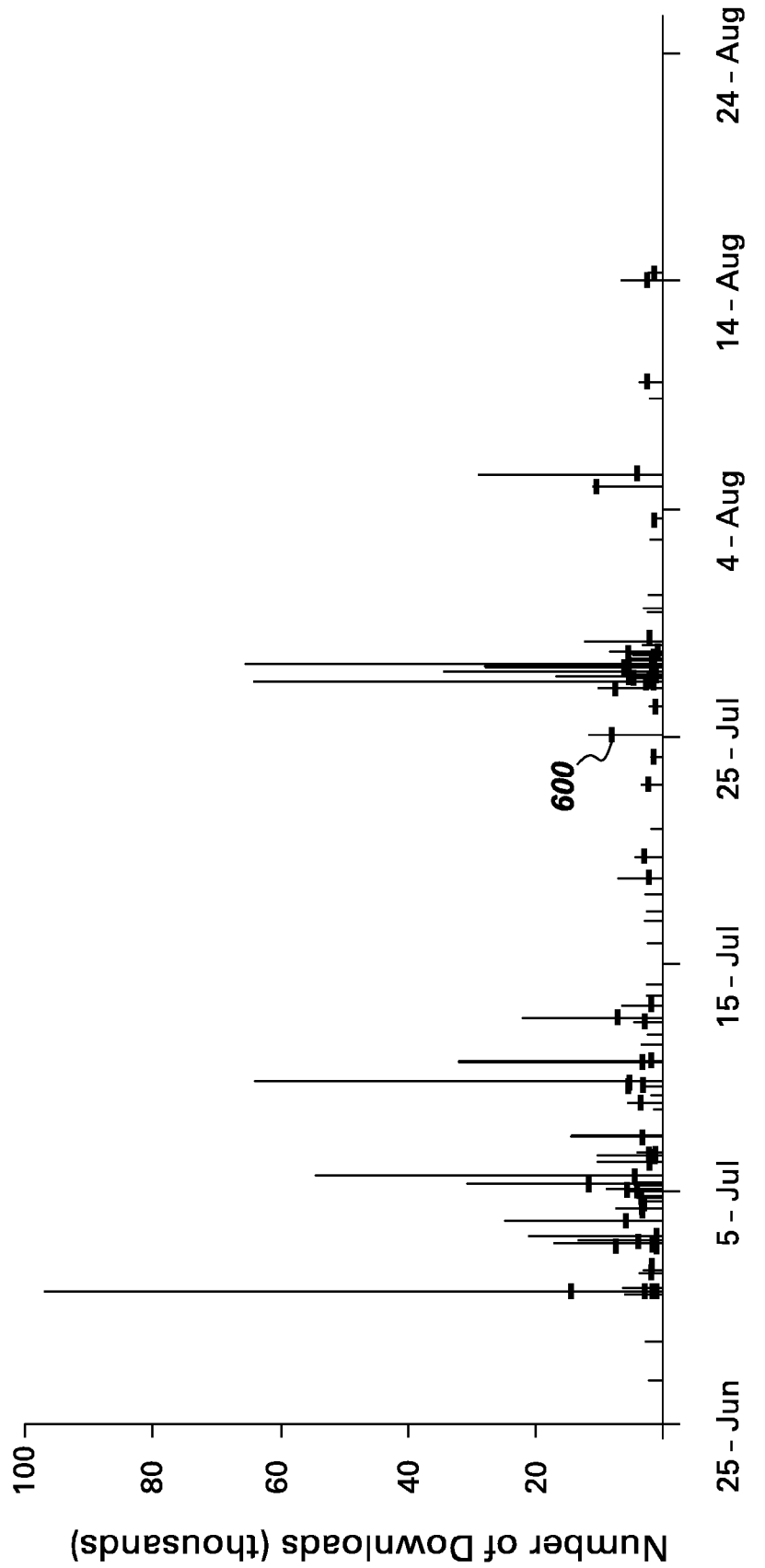
FIG. 10 shows the performance results for the real time identification of volume/high risk swarms of FIG. 9.

FIG. 10 shows the swarm activity and identification of the high volume swarms depicted in FIG. 9, but highlights the point 600 at which the high risk swarms were identified. In this trial, the high risk swarms were detected early in the life of the particular swarm and all the high risk swarms were identified without misses.

Figure 11:
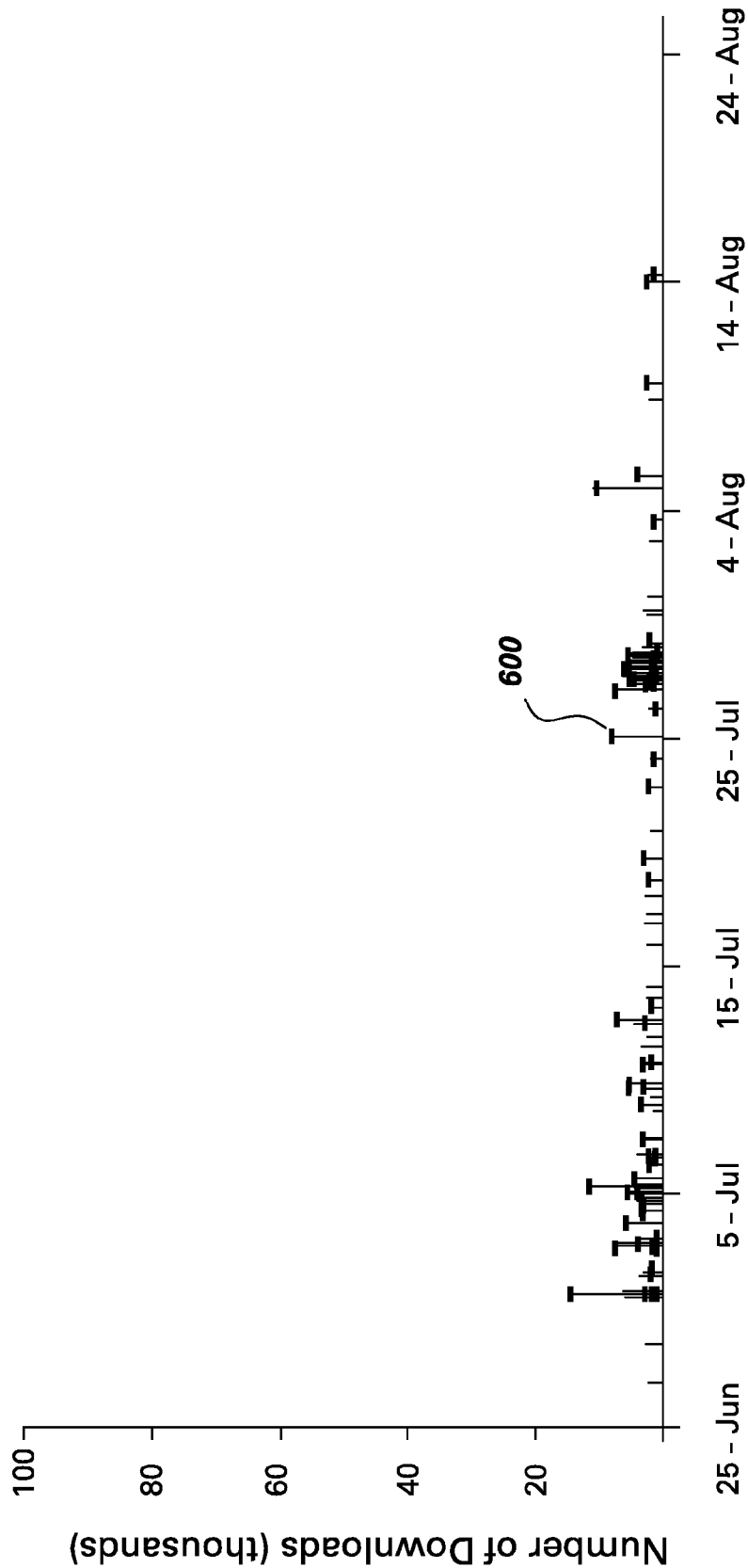
FIG. 11 shows the indication parameters for the real time identification of high volume/risk swarms.

In order to further illustrate the significance of the early detection of the high risk swarms, FIG. 11 shows the point 600 at which the high risk swarms were identified and the significant decrease in the download activity if the high risk swarms were stopped at that time 600.

Over their lifetimes, swarms attract anywhere from less than one hundred to tens, even hundreds of thousands of piracy users. Early discovery of high risk swarms has many benefits, such as more effective utilization of anti-piracy resources, timely response action, verified notice sending and real-time feedback on the effectiveness of anti-piracy programs. It is much simpler to identify and take action on the top percentage of swarms that provided the majority of the downloads once the swarm is essentially complete.

The concepts in one embodiment are related to a system and processing for early detection of high risk swarms. It is noted that only a handful of swarms account for most of the piracy activity. New peers that join the swarm early are indicative of the final size of the swarm, and in particular, the use of the LogNormal distribution of number of peers. One embodiment is a system providing tracking early swarm data (i.e., number of new users joining the swarm) to predict whether or not the swarm will eventually become a large size swarm.

The further benefits of early detection of high risk swarms includes at least targeted deployment of anti-piracy tools (detection, notices, counter-measures, ISP relationships) to high risk swarms as opposed to all swarms; improved allocation of ISP bandwidth resources based on predicted popularity swarms; proactive permitting action before the problem grows; timely action within hours, not days; high confidence with cease-and-desist notices; and real-time measurement of impact, with early detection of data anomalies.

One embodiment is a method for identifying high volume swarms in advance and deploying resources accordingly. In this particular example, the focus is not on identifying piracy but on the early identification of high volume peers so that the network resources can be adjusted accordingly. In one example, the network resources can be adjusted to accommodate a growing swarm by providing greater bandwidth allocation. The providers of the network resources may be able to make a price adjustment for the high volume swarms to recoup costs. Alternatively, the network provider may proceed to diminish or cap network resources once some limit of data activity is met. In certain aspects the processing for the high risk swarms also indicate the high volume swarms and allows for traffic shaping for the ISPs.

The foregoing description of the embodiments has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An early identification system for high volume swarms involved in distribution of a target asset on a peer-to-peer network, comprising:
    a data gatherer stored on a non-transitory computer readable medium with executable code that gathers swarm data including peer-to-peer swarm activity involving distribution of peer-to-peer content;
    data gatherer circuitry configured to execute the executable code of the data gatherer;
    an analytics section stored on a computer readable medium with executable code establishing a high volume swarm detection threshold for the target asset and processing the swarm data, wherein: the high volume swarm detection threshold is initially set as a static number and the static number is used until a level of swarm data defined by an adjustable threshold parameter is collected; and
    analytics section circuitry configured to identify and flag the high volume swarms as those having a number of unique peers involved in the distribution of the target asset such that the number of unique peers exceeds the threshold, such that the early identification system indicates the high volume swarms involved in distribution of the target asset.

2. The system according to claim 1, further comprising a verification section for confirming that the peer-to-peer content from the high volume swarms is likely to be the target asset.

3. The system according to claim 1, wherein the unique peers are based upon unique Internet Protocol (IP) addresses.

4. The system according to claim 1, wherein the level of swarm data is at least swarm data for 30 swarms.

5. The system according to claim 1, wherein the threshold is calculated using a predictive model or a probabilistic model.

6. The system according to claim 1, further comprising a pre-processing section for conditioning the swarm data.

7. The system according to claim 1, wherein network resources are allocated based upon the high volume swarms.

8. The system according to claim 1, wherein the data gatherers are crawlers in the peer-to-peer network.

9. The system according to claim 1, further comprising a database coupled to the data gatherer and the analytics section, the database storing the swarm data over time.

10. The system according to claim 9, further comprising organizing the swarm data into organized master swarm data comprising historical data of swarm activity over a certain period of time and storing the master organized swarm data in said database.

11. A tangible, non-transitory, computer readable medium, comprising computer executable instructions for identifying high risk swarms involved in unauthorized distribution of a target asset, the computer executable instructions comprising instructions to:
    retrieve swarm data, wherein the swarm data is involved in downloading of an alleged target asset;

set a high volume swarm detection threshold for the target asset at a static number if there is an inadequate amount of swarm data;

update the threshold;

flag alleged high risk swarms as those that exceed the threshold; and verify that the alleged high risk swarms are the high risk swarms involved in the download of the target asset, by downloading the alleged target asset for comparison to the target asset.

12. The computer readable medium of claim 11, wherein the instructions to update the threshold comprises processing instructions based on predictive models or probabilistic models.

13. The computer readable medium of claim 11, further comprising instructions to store and organize the swarm data in a database.

14. The computer readable medium of claim 11, further comprising instructions for pre-processing the swarm data.

15. The computer readable medium of claim 11, further comprising instructions to collect the swarm data without any processing until a pre-defined swarm number is obtained or based upon a collection time period.

16. The computer readable medium of claim 11, further comprising instructions to analyze the high volume swarms for patterns and extract business intelligence based upon the patterns, wherein the business intelligence is useful for making business decisions based on the patterns.

17. The computer readable medium of claim 11, further comprising instructions to notify Internet Service Providers of one or more of the high volume swarms.

* * * * *